United States Patent
Lebar

(10) Patent No.: US 7,926,079 B2
(45) Date of Patent: *Apr. 12, 2011

(54) HYBRID CENTRAL/DISTRIBUTED VOD SYSTEM WITH TIERED CONTENT STRUCTURE

(75) Inventor: Metod Lebar, Mililani, HI (US)

(73) Assignee: Time Warner Cable, a division of Time Warner Entertainment Company, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/535,914

(22) Filed: Aug. 5, 2009

(65) Prior Publication Data

US 2010/0043035 A1 Feb. 18, 2010

Related U.S. Application Data

(63) Continuation of application No. 09/876,677, filed on Jun. 7, 2001, now Pat. No. 7,690,020.

(60) Provisional application No. 60/215,500, filed on Jun. 30, 2000.

(51) Int. Cl.
H04N 7/173 (2006.01)
(52) U.S. Cl. ............... 725/90; 725/93; 725/96; 709/217
(58) Field of Classification Search ............ 725/87–134; 709/217–231
See application file for complete search history.

(56) References Cited

U.S. PATENT DOCUMENTS

| | | | |
|---|---|---|---|
| 5,172,413 A | | 12/1992 | Bradley et al. |
| 5,303,229 A | | 4/1994 | Withers et al. |
| 5,446,919 A | | 8/1995 | Wilkins |
| 5,485,485 A | * | 1/1996 | Briskman et al. ............ 375/130 |
| 5,550,577 A | | 8/1996 | Verbiest et al. |
| 5,592,626 A | | 1/1997 | Papadimitriou et al. |
| 5,790,176 A | * | 8/1998 | Craig ............................ 725/115 |
| 5,822,102 A | * | 10/1998 | Bodeep et al. .................. 398/69 |
| 5,850,218 A | | 12/1998 | Lajoie et al. |
| 5,878,078 A | | 3/1999 | Griffin et al. |
| 5,898,456 A | * | 4/1999 | Wahl .............................. 725/91 |

(Continued)

FOREIGN PATENT DOCUMENTS

WO 98/31115 A1 7/1998

OTHER PUBLICATIONS

Chan, S. H., et al.. "Caching schemes for distributed video services." Communications, 1999. ICC '99. 1999 IEEE International Conference, Vancouver, BC, Canada, Jun. 6-10, 1999. Piscataway, NJ: IEEE, Jun. 6, 1999, pp. 994-999.

(Continued)

*Primary Examiner* — Annan Q Shang
(74) *Attorney, Agent, or Firm* — The Marbury Law Group, PLLC

(57) ABSTRACT

A system and method for selecting a network path for delivering on-demand content in a multi-channel network. A hybrid central/distributed and tiered video on demand (VOD) service network with tiered content structure uses media servers located in both the headend station and the hub stations. The hub media server is configured as a primary source for VOD content and the central media server located in the headend is configured as a secondary source of video content. A path for delivery of content may be determined based on the availability of content and network components.

18 Claims, 13 Drawing Sheets

U.S. PATENT DOCUMENTS

| | | | | |
|---|---|---|---|---|
| 5,907,544 | A | 5/1999 | Rypinski | |
| 5,916,303 | A | 6/1999 | Scott | |
| 5,936,659 | A | 8/1999 | Viswanathan et al. | |
| 5,940,738 | A * | 8/1999 | Rao | 725/103 |
| 6,035,339 | A | 3/2000 | Agraharam et al. | |
| 6,065,042 | A | 5/2000 | Reimer et al. | |
| 6,100,883 | A * | 8/2000 | Hoarty | 715/721 |
| 6,118,976 | A | 9/2000 | Arias et al. | |
| 6,240,073 | B1 | 5/2001 | Reichman et al. | |
| 6,305,019 | B1 | 10/2001 | Dyer et al. | |
| 6,378,130 | B1 | 4/2002 | Adams | |
| 6,438,596 | B1 | 8/2002 | Ueno et al. | |
| 6,673,662 | B2 * | 1/2004 | Singh | 438/167 |
| 6,701,528 | B1 | 3/2004 | Arsenault et al. | |
| 6,718,552 | B1 | 4/2004 | Goode | |
| 6,728,766 | B2 * | 4/2004 | Cox et al. | 709/220 |
| 6,738,983 | B1 | 5/2004 | Rao et al. | |
| 6,754,907 | B1 | 6/2004 | Schumacher et al. | |
| 6,760,758 | B1 * | 7/2004 | Lund et al. | 709/217 |
| 6,804,825 | B1 | 10/2004 | White et al. | |
| 6,857,132 | B1 | 2/2005 | Rakib et al. | |
| 6,973,662 | B1 | 12/2005 | Sie et al. | |
| 7,089,577 | B1 | 8/2006 | Rakib et al. | |
| 7,269,854 | B2 * | 9/2007 | Simmons et al. | 726/29 |
| 7,669,220 | B2 * | 2/2010 | Goode | 725/95 |
| 7,690,020 | B2 * | 3/2010 | Lebar | 725/90 |
| 2002/0007491 | A1 * | 1/2002 | Schiller et al. | 725/87 |
| 2002/0046405 | A1 | 4/2002 | Lahr | |
| 2002/0124262 | A1 * | 9/2002 | Basso et al. | 725/109 |

OTHER PUBLICATIONS

Summons to Attend Oral Proceedings Pursuant to Rule 115(1) EPC, European Application 01946721.6. European Patent Office, Aug. 4, 2010.

Ciciora, Walter D., Ph.D. Cable Television in the United States: An Overview. Cable Television Laboratories, Inc., Louisville, CO, May 25, 1995.

Communication Pursuant to Article 94(3) EPC, European Application 01946721.6. European Patent Office, Dec. 8, 2009.

Response to Examination Report, European Application 01946721.6, submitted May 25, 2010.

Supplementary European Search Report, European Application 01946721.6. European Patent Office, Oct. 23, 2009.

Office Action, Japanese Application P2002-507250. Japanese Patent Office, Apr. 17, 2007.

Response to Office Action, Japanese Application P2002-507250, submitted Nov. 26, 2007.

* cited by examiner

Figure 8A:
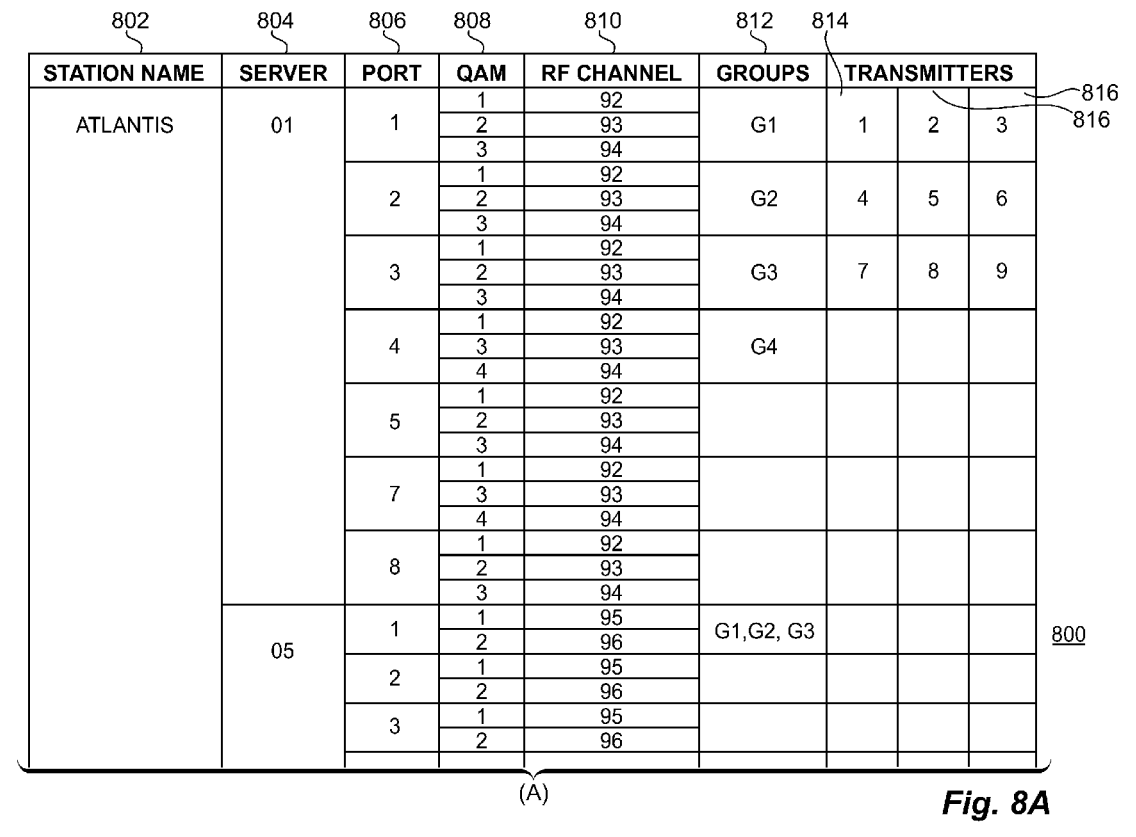

| STATION NAME | SERVER | PORT | QAM | RF CHANNEL | GROUPS | TRANSMITTERS | | |
|---|---|---|---|---|---|---|---|---|
| ATLANTIS | 01 | 1 | 1 | 92 | G1 | 1 | 2 | 3 |
| | | | 2 | 93 | | | | |
| | | | 3 | 94 | | | | |
| | | 2 | 1 | 92 | G2 | 4 | 5 | 6 |
| | | | 2 | 93 | | | | |
| | | | 3 | 94 | | | | |
| | | 3 | 1 | 92 | G3 | 7 | 8 | 9 |
| | | | 2 | 93 | | | | |
| | | | 3 | 94 | | | | |
| | | 4 | 1 | 92 | G4 | | | |
| | | | 3 | 93 | | | | |
| | | | 4 | 94 | | | | |
| | | 5 | 1 | 92 | | | | |
| | | | 2 | 93 | | | | |
| | | | 3 | 94 | | | | |
| | | 7 | 1 | 92 | | | | |
| | | | 3 | 93 | | | | |
| | | | 4 | 94 | | | | |
| | | 8 | 1 | 92 | | | | |
| | | | 2 | 93 | | | | |
| | | | 3 | 94 | | | | |
| | 05 | 1 | 1 | 95 | G1,G2, G3 | | | |
| | | | 2 | 96 | | | | |
| | | 2 | 1 | 95 | | | | |
| | | | 2 | 96 | | | | |
| | | 3 | 1 | 95 | | | | |
| | | | 2 | 96 | | | | |

| | | | | (A) | | | | |
|---|---|---|---|---|---|---|---|---|
| ATLANTIS (CONT'D) | | 4 | 1 | 95 | | | | |
| | | | 2 | 96 | | | | |
| | | 5 | 1 | 95 | G4 | | | |
| | | | 2 | 96 | | | | |
| | | 6 | 1 | 95 | G5, G6 | | | |
| | | | 2 | 96 | | | | |
| | | 8 | 1 | 95 | | | | |
| | | | 1 | 96 | | | | |
| GOTHAM | 10 | 1 | 1 | 91 | G5 | 11 | 12 | |
| | | | 2 | 92 | | | | |
| | | | 3 | 93 | | | | |
| | | | 4 | 94 | | | | |
| | | 2 | 1 | 91 | G6 | 13 | 14 | |
| | | | 2 | 92 | | | | |
| | | | 3 | 93 | | | | |
| | | | 4 | 94 | | | | |
| | | 5 | 1 | 92 | | | | |
| | | | 2 | 93 | | | | |
| | | 6 | 1 | 92 | | | | |
| | | | 2 | 94 | | | | |
| METROPOLIS | 15 | 1 | 1 | 92 | | | | |
| | | | 2 | 93 | | | | |
| | | 2 | 1 | 92 | | | | |
| | | | 3 | 94 | | | | |
| | | 5 | 2 | 93 | | | | |
| | | | 3 | 94 | | | | |
| | | 6 | 1 | 92 | | | | |
| | | | 2 | 93 | | | | |

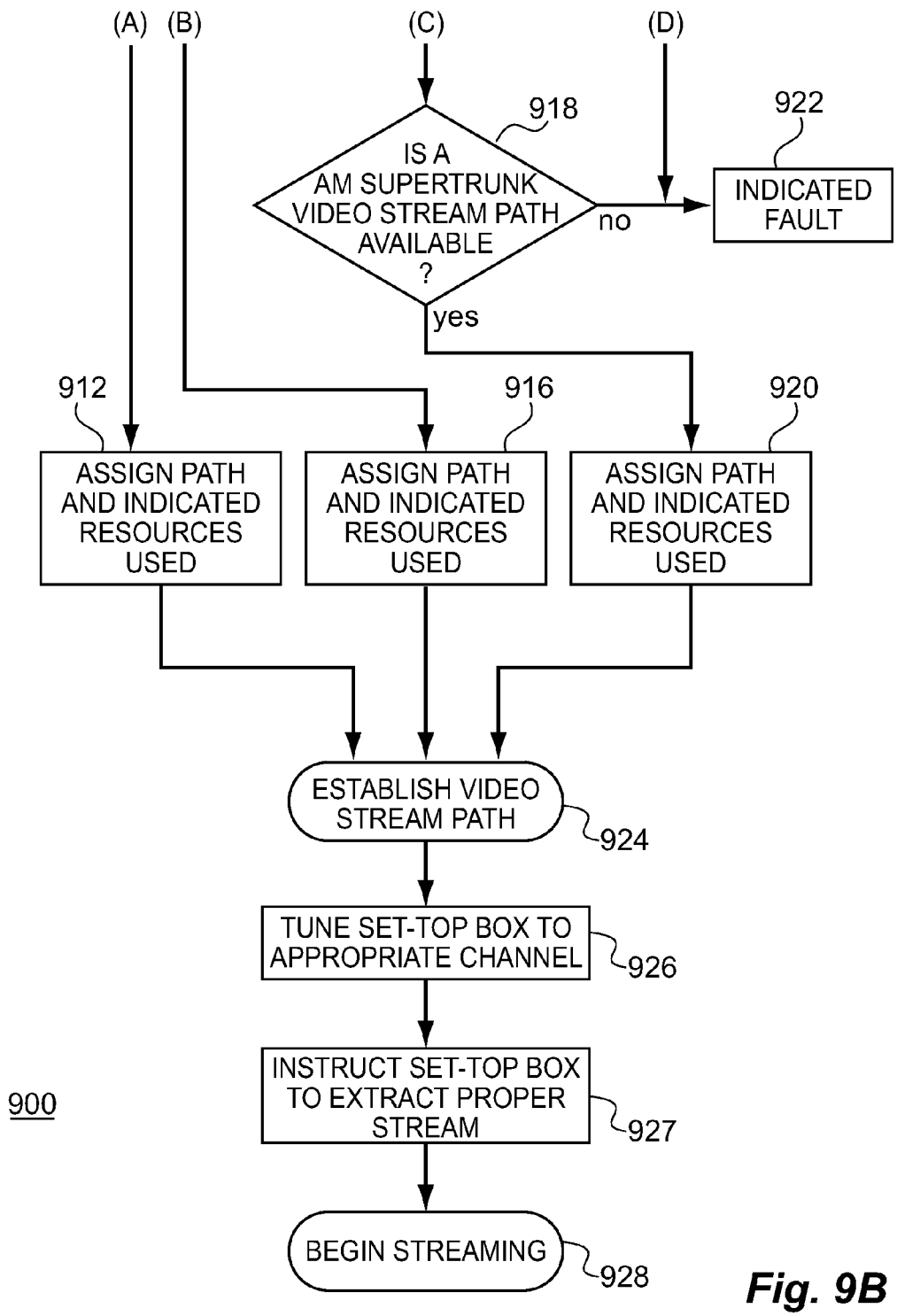

HYBRID CENTRAL/DISTRIBUTED VOD SYSTEM WITH TIERED CONTENT STRUCTURE

RELATIONSHIP TO OTHER APPLICATIONS

This application is a continuation of U.S. application Ser. No. 09/876,677 filed Jun. 7, 2001, now U.S. Pat. No. 7,690,020 which claims the benefit of U.S. Provisional Patent Application Ser. No. 60/215,500 filed Jun. 30, 2000. The 60/215,500 and Ser. No. 09/876,677 applications are incorporated herein by reference in their entireties for all purposes.

BACKGROUND

Video on demand (VOD) is not a new concept. It has been implemented in small scale, closed systems for a number of years (as used in this application, closed system means additional users cannot be added after the system has been installed). In particular, VOD has been used in hotels, on airplanes, and in other, similar closed systems. Recently, larger scale television services have begun implementing VOD services on larger, open television systems (as used in this application, open system means additional users can be added after the system has been installed). U.S. Pat. No. 5,850,218, issued Dec. 15, 1998, to Lajoie et al. for "Inter-Active Program Guide with Default Selection Control," incorporated herein by reference, describes one possible television network capable of supplying VOD services. A television system in Orlando, Fla. has implemented a VOD system similar to the one described in U.S. Pat. No. 5,850,218.

As is evident in the above examples, conventional wisdom for implementing VOD services in television systems contemplated a centralized service. The centralized VOD service model placed (or housed) the computers and media servers necessary to implement and control the VOD services in the central or headend location. Customers would access the servers through their set-top boxes. The set-top boxes would communicate with the media server at the headend to establish a video stream for the requested video. On a smaller scale with a limited number of users, such as the hotel system mentioned above, the centralized service works fairly well. Centralized VOD services work in the smaller environment partially due to the predictable and limited number of video streams that are necessary to satisfy expected peak demand for VOD services. Additionally, the content of the smaller centralized server is typically limited to "new release" types of movies.

However, implementing the centralized system on a large and potentially ever increasing open network system is prohibitively expensive because of the large size of the content transport network required to support the number of interactive video sessions. For example, in a network with 500,000 customers and assuming 10% (50,000) are simultaneous users, 20,000 Mbps must be available from the headend to the hubs to support the expected peak demand of the VOD services. Increasing demand causes a corresponding increase in the number of video streams that the centralized server needs to provide. Furthermore, in the typical wide area television network, the number of subscribers continually increases. As the number of subscribers increases or the demand expands, it becomes increasingly difficult to provide the server streaming capacity and the bandwidth and switching capability of the interactive transport network to accommodate the increase in users. It would therefore be beneficial to develop a content delivery system having VOD services that was not reliant solely on the centralized media source.

By distributing servers to hubs (closer to the customers), the size of the fiber transport network can be reduced, which significantly reduces the costs associated with implementing a large-scale interactive VOD service. A purely distributed system, however, has some of its own disadvantages. As all servers must provide all and any content that is promoted as available on the system, each server must provide a large storage capacity that must include low-demand library titles. Such content numbering in hundreds or thousands of titles consumes the vast majority of storage capacity, yet it generates very limited revenues. It can be documented that 90% of such content generates only 10% of the earnings, while the current 10% of the high-demand content generates 90% of the total revenues. In addition, a purely distributed system cannot realistically support interactive VOD functionality for real time events that would provide personal video recorder (PVR) experience for live events. Therefore, it is desirous to develop and engineer a hybrid central/distributed VOD system with a tiered content structure that would provide a vastly superior technical and economical performance. It segregates the content according to its demand and makes each of the high and low demand content available in a most economic and reliable fashion to the users. It would further enable fully interactive real time event VOD services, providing PVR functionality. The hybrid central/distributed VOD system with a tiered content structure is applicable to interactive content delivery systems used in cable systems, as well as geographically larger delivery systems such as internet, satellite or regional DSL service systems. For example, as set top boxes and satellite receivers with record and replay capability are becoming available, the term "hub server" as it relates to high demand content storage may be supplemented by any of these home devices. One may assume high demand content to be pushed to homes (as it is now file transferred to the hub servers) while the low demand content is ordered on an individual basis (as it is now from central server).

SUMMARY

To attain the advantages of and in accordance with the purpose of the present invention, as embodied and broadly described herein, content delivery systems for supplying video on demand in a broadband environment include a headend station having a central media server and at least one hub station having a hub media server. The headend and the hub stations also have tiered content storage capability and radio frequency management infrastructure. Video on demand content is supplied via a distribution network to the set-top boxes preferably from a nearby high-demand content hub server and secondary from the central media server over a content transport network. The radio frequency management infrastructure modulates and directs the content streams. It further groups the channels for delivery of video on demand services from the radio frequency management infrastructure to the set-top boxes over a distribution network.

Other embodiments of the present invention provide methods of interactive delivering video on demand services. These methods include requesting a video on demand service. After requesting the service, a video on demand asset database is accessed to identify available delivery assets and data stream paths. Particular assets are determined, identified, and assigned to deliver the requested video on demand service to the set-top box. After the assignment of the assets, the video on demand service is supplied over the assigned data stream path.

Still other embodiments of the present invention provide computer program products having computer readable code for delivering video on demand service. The computer program product may include a requesting module configured to receive requests for video on demand services from a viewer. A determining module may be configured to access a video on demand asset database to identify assets capable of being used to deliver the requested video on demand service and to determine whether assets are available to deliver the requested service. An identifying module then identifies a particular data stream path from the assets determined to be available. An assigning module may be configured to assign the identified data stream path to deliver the requested video on demand service and to update the asset database to indicate the assets are no longer available. Finally, a supplying module may be configured to supply the requested VOD service over the assigned data stream path.

The foregoing and other features, utilities and advantages of the invention will be apparent from the following more particular description of a preferred embodiment of the invention as illustrated in the accompanying drawings.

DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIGS. 8A and 8B illustrate a database showing transport stream identification numbers in accordance with an embodiment of the present invention; and FIGS. 9A and 9B illustrate a flow chart showing the establishment of a video stream path in accordance with an embodiment of the present invention.

DETAILED DESCRIPTION

FIGS. 1-9 refer to television systems having VOD services in accordance with aspects of the preferred embodiments of the present invention. While the present invention is described with respect to cable television systems, one of ordinary skill in the art would recognize on reading the disclosure that the present invention is applicable to other types of content, like audio, or delivery systems, such as the Internet, regional DSL service systems, wireless content delivery systems, satellite delivery systems, etc. As used in this application, VOD (video on demand), which while a particular form of COD (content on demand), is used to identify on demand services that could be videos or any other type of interactive and/or content on demand service, such as ordering retail merchandise, food, etc. Basically, this Patent Application uses the term "video" interchangeably with the term "content" as an abbreviation for any content such as video, audio, data, etc. Upon reading the following disclosure, one of skill in the art will now recognize that alternate and equivalent embodiments of the present invention are possible and may be made without departing from the spirit and scope of the present invention.

Centralized and Distributed VOD

Figure 1:
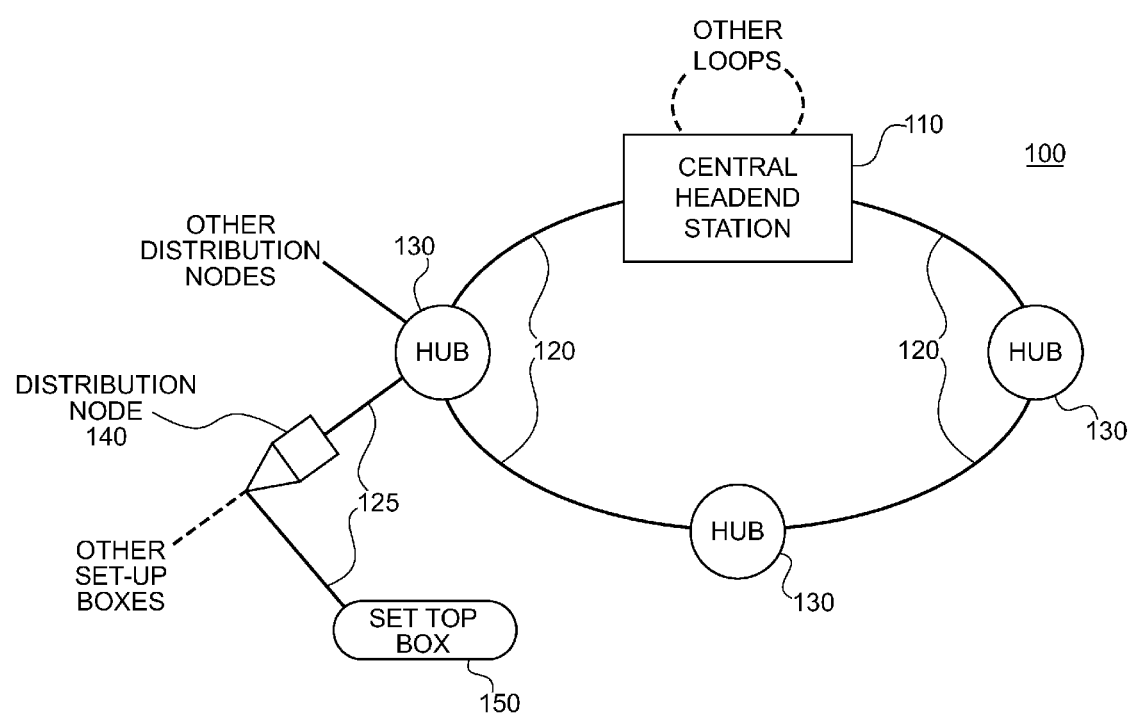
FIG. 1 is a system wide schematic diagram of a cable television system in accordance with an embodiment of the present invention.

FIG. 1 shows part of a conventional broadband, multi-channel cable television system 100. System 100 includes several components. In particular, system 100 includes a central headend station 110, a fiber transport network 120, a plurality of hub stations 130, and a hybrid fiber coax distribution network 125. The distribution network 125 distributes signals from the hub station 130 to at least one set-top box 150 through at least one distribution node 140. The set-top box 150 could be a stand alone unit associated with a television, as shown, or set-top box 150 could be integrated into a computing device (such as a personal computer, a compatible television, etc.) on which the VOD service is displayed to a user. As one of ordinary skill in the art would recognize, system 100 represents only part of the television system associated with central headend station 110. In practice, central headend station 110 provides television services to several other hubs connected by other fiber transport networks, not specifically shown. Moreover, a regional cable television network may connect to several central headend stations 110 in a wide area transport network.

Not specifically shown in FIG. 1 but well known in the art, central headend station 110 typically includes control software packages. Typically, the control software includes back-office control software and resource management software. Back-office control software includes such functions as billing, accounting and the like. Resource management software controls the resources of the television system and assigns resources as needed for particular video streams (operation of the resource management software in conjunction with the distributed VOD services will be explained in more detail below).

Figure 2:
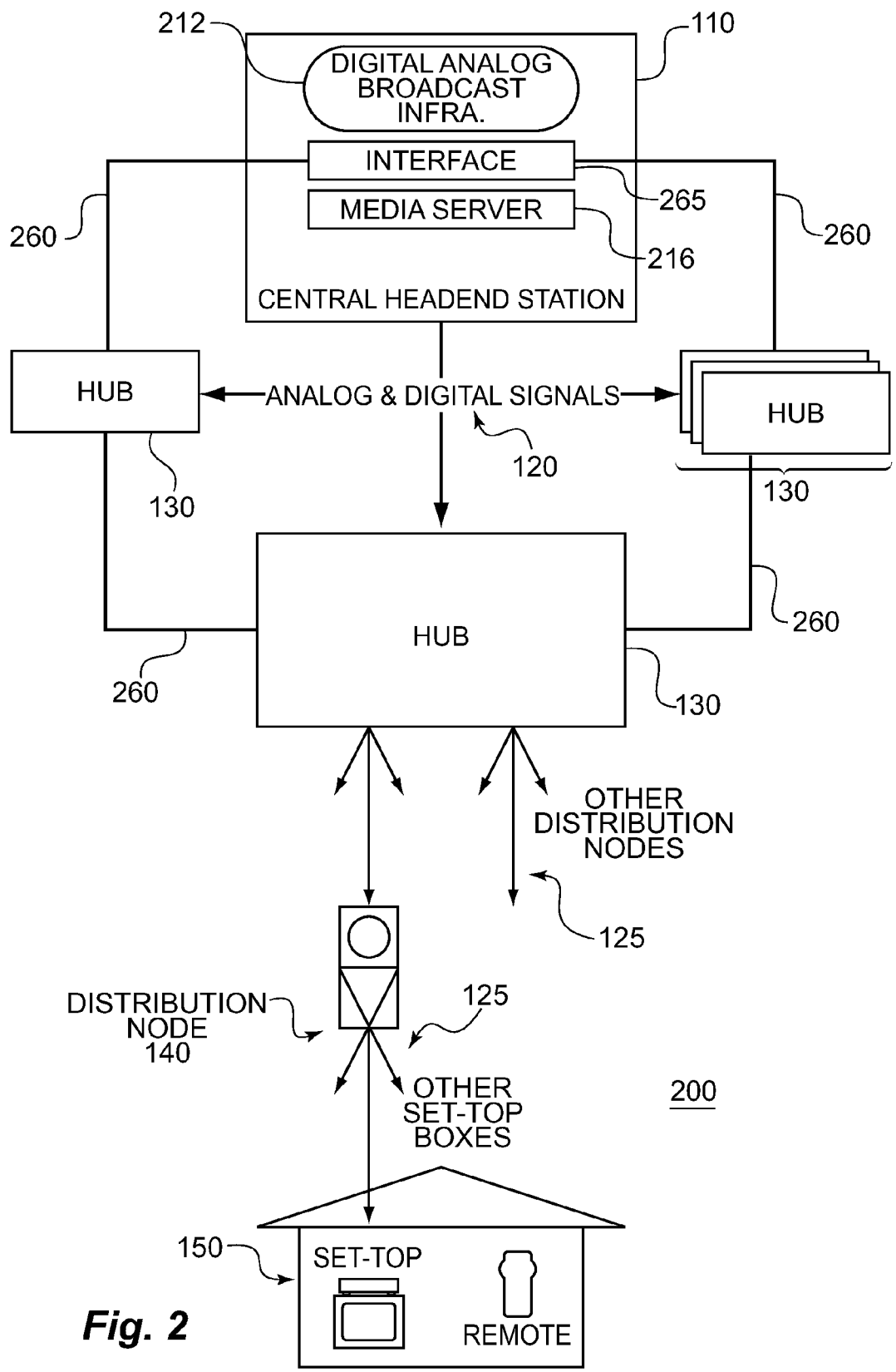
FIG. 2 is a system wide schematic diagram of a cable television system having centralized video-on-demand service in accordance with an embodiment of the present invention.

FIG. 2 shows a conventional television system 200 having centralized VOD services. System 200 includes the central headend station 110, the fiber transport network 120, at least one hub station 130, and the hybrid fiber coax distribution network 125. The distribution network 125 distributes signals from the hub station 130 to at least one set-top box 150 through at least one distribution node 140.

Central headend station 110 includes conventional digital/analog broadcast infrastructure 212, which typically includes digital receivers, analog receivers, processors and modulators, not specifically shown. Digital/analog broadcast infrastructure 212 provides digital and analog broadcast services over system 200 using the fiber transport network 120. Central headend station 110 also includes at least one central media server 216. Using conventional methods, central media server 216 is connected to a high speed transport network 260, which as will be explained below is referred to as data network 260, through an interface 265 to provide VOD services to set-top boxes (viewers) 150. (Note, all VOD services could be provided over fiber transport network 120, but this is not conventionally done due to the bandwidth constraints). Moreover, it is preferred to connect the resource management software to the data network 260 to manage system resources, not specifically shown but generally known in the art.

In a centralized VOD system, central media server 216 and the high speed transport data network 260 must be sized to provide video streams for the peak VOD load expected. The peak VOD loads on system 200 for VOD services include the expected peak data streams associated with all the set-top boxes 150 associated with system 200 as well as for expected peaks on other systems attached to central headend station 110, but not shown. For example, in even relatively controlled distribution networks having a limited number of users, it is not unrealistic to expect peak demand on the media server 216 to be upwards of tens of thousands of data streams.

Conventionally, the high speed transport data network 260 is an asynchronous transfer mode (ATM) switching system, although other high speed transport data networks are usable, such as, for example, a SONET or Internet Protocol based system. Using an ATM system, interface 265 needs to convert the video streams from an as stored MPEG format to an ATM cell format prior to transport over the ATM system. Further, each hub needs to reconvert the ATM cell back to MPEG. Alternatively to reconverting in the hub, the ATM system could extend into the set-top box and then be reconverted into MPEG; however, extending the ATM network into the set-top box is inefficient. Thus, if the VOD content is sent over the ATM system, it is preferable to convert back to MPEG format in the hubs and use distribution network 125 to deliver the requested video content or asset to the set-top boxes.

Developing a high speed transport data network capable of providing potentially tens of thousands of data steams, as well as being expandable if it becomes necessary to support additional video streams, is very expensive from both a bandwidth and equipment point of view. Moreover, the associated equipment necessary to provide the expected capacity of video streams requires a significant amount of space for installation. This space is often at a premium in central headend station 110 that also houses other necessary components of system 200.

Instead of supplying all VOD assets from video streams that originate at the central media server 216, it would be desirous to support data streams from the hub stations. Unlike a single (or multiple) central media server, where the media server and high speed transport network need to support peak demand over all of its associated systems, a hub media server in the hub station would only need to support expected peak demand for the set-top boxes associated with that hub station. Thus, each hub server would need to supply fewer data streams than a single central server. Moreover, the central media server and the high speed transport network would need to supply correspondingly fewer data streams also (i.e., as the number of data streams supported by the hub media server increases, the number of data streams the central media server needs to support decreases). As the number of video streams that are expected to be supported by the central media server 216 decreases, the high speed transport networks 260 and 360 (transport 360 is explained further below) can correspondingly decrease in size. As the size of the high speed transport networks decreases, the overall cost of the system is likely to decrease. Furthermore, the hub media servers do not need a high speed transport data network to transfer the data stream to the set-top boxes as hub media servers connect directly to the already installed broadband distribution network 125.

Figure 3:
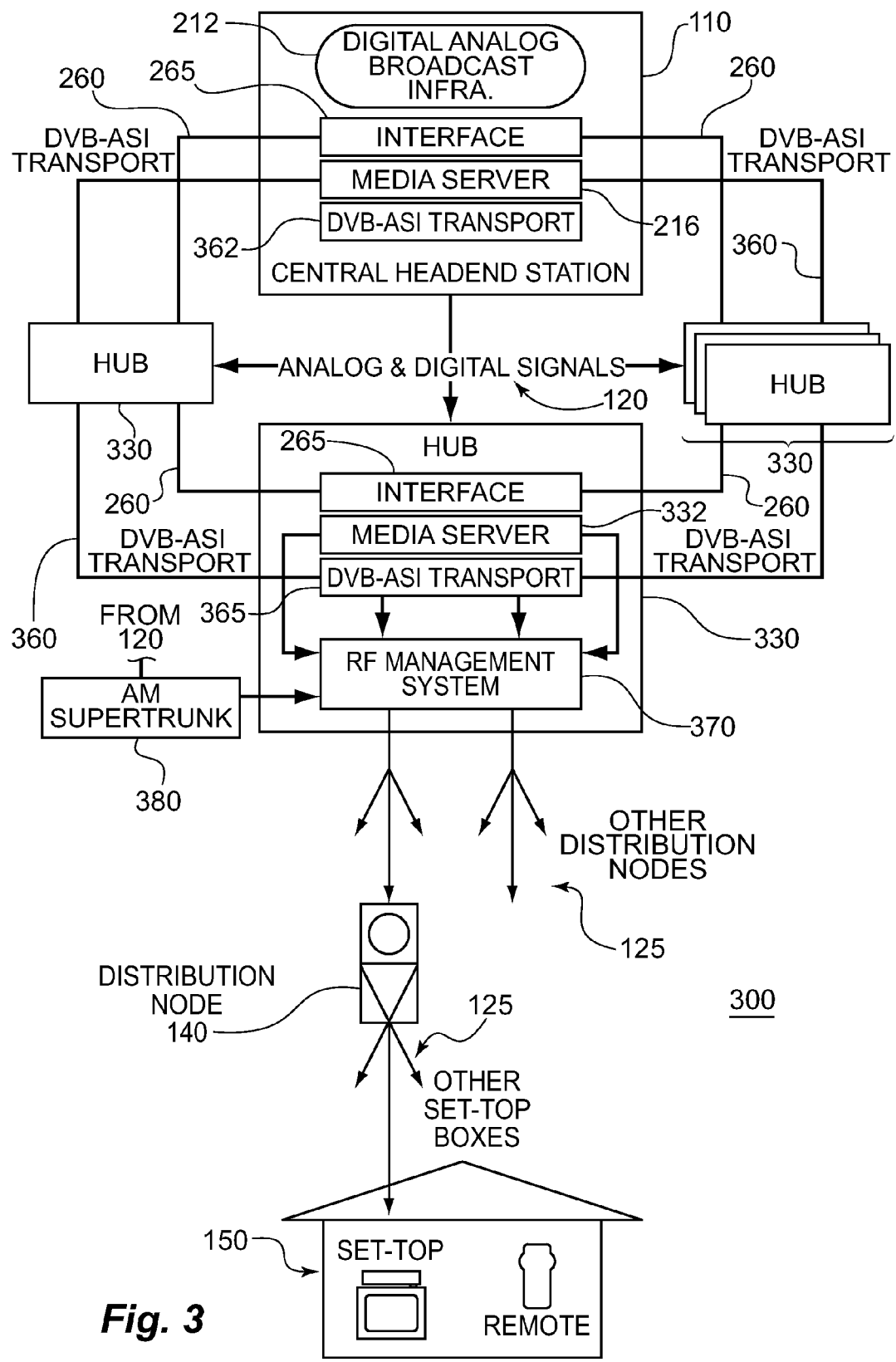
FIG. 3 is a system wide schematic diagram of a cable television system having a hybrid central and distributed video-on-demand service in accordance with an embodiment of the present invention.

FIG. 3 shows a content distribution system 300 having hybrid central/distributed VOD services in accordance with an embodiment of the present invention. System 300 includes the central headend station 110, the fiber transport network 120, a plurality of hub stations 330, and the hybrid fiber coax distribution network 125. Distribution network 125 distributes signals from a hub station 330 to at least one set-top box 150 through at least one distribution node 140.

Central headend station 110 also includes the conventional digital/analog broadcast infrastructure 212, which typically includes digital receivers, analog receives, processors and modulators, not specifically shown. Digital/analog broadcast infrastructure 212 provides digital and analog broadcast services over system 300 using the fiber transport network 120. Central headend station 110 also includes at least one central media server 216. Hub stations 330 include a hub media server 332. While central media server 216 could use high speed transport data network 260 to deliver VOD services to set-top boxes (i.e., central media server 216 uses interface 265 to convert the MPEG format video stream to the appropriate protocol for the high speed transport data network 260, such as ATM cell protocol, and transfer the requested asset or content to Hub 330, which would then use a corresponding interface 265 to convert the, for example, ATM cell back to MPEG format for delivery to the distribution network 125 and eventually to set-top boxes), it is preferable to establish a separate VOD content transport network 360, as will be explained in more detail below.

System 300 still includes the high speed transport data network 260 and interface 265, however. As will be explained further in connection with FIG. 6, data network 260 and interface 265 are connected to the resource management software so that the resource management software can communicate with the hub stations. Further, as will be explained further in connection with FIG. 7, it is preferable to use data network 260 to propagate content and assets from central media server 216 to hub media servers 332 as the real-time interactivity is not required. Using data network 260 for these functions is preferable because most television systems already have such a network installed on a smaller scale, which is sufficient for the control and file transfer functions. For example, data network 260, in some television systems, is the ATM switching system described above using 100 BaseT Internet protocols, although as also explained above, multiple protocols are available. Lately, for example, 1 GigE is gaining momentum.

Hub media servers 332 are sized to provide the expected high-demand content peak number of data streams for the set-top boxes 150 attached to hub station 330. While hub media servers 332 can include all the video content of central media server 216, it is preferred to only store high demand video content in the hub media servers 332. In this embodiment, central media server 216 and VOD content transport network 360 only need to have sufficient capacity to provide backup data streams if a predetermined number of hub media servers 332 (or the associated hardware) fail or are unavailable for some reason, and to provide video stream capacity for those low demand video content programs stored only in the central media server. Because the majority of the data streams are provided from hub media server 332, central media server 216 and—VOD content transport network 360 only need to be sized to provide a fraction of the data streams that a single central media server would need to provide. Reducing the number of data streams the central media server needs to provide reduces the size of VOD transport network 360, which significantly reduces the cost of the VOD transport network 360. Moreover, additional demand due to an increase in subscribers can be supplied from existing hub media servers 332, where space is available. Alternatively, as demand on system 300 increases, additional hub stations 330 and media servers 332 can be added to capture the increased demand.

Two additional aspects of the above distributed system provide increased flexibility of the television network. In a preferred embodiment, central media server 216 could also act as a hub media server for a hub station incorporated in the central headend station. Moreover, some small hub stations 330, typically those without a significant number of attached set-top boxes 150, do not need to have a hub media server 332. Rather these small hub stations use data streams from the central media server 216 to supply VOD services. Thus, when the cost of additional data streams from central server 216 over the VOD content transport network 360 is below the cost of including hub media server 332 in hub station 330, the distributed system is flexible enough to provide the data streams from the central media server.

The Native Format Content Transport Network

As explained above, conventional wisdom for connecting central headend station 110 and remote hub stations 330 to provide VOD services used the high speed transport data network 260, which may be an ATM switching system or other equivalent high speed transport networks. These systems, however, do not efficiently transmit video content using the standard MPEG video protocol. In order to transmit MPEG video content over an ATM system, the MPEG video content must be converted to the ATM cell protocol, for example. Therefore, delivering MPEG video content using the ATM system results in decreased transmission efficiency. Thus, it is preferable to transfer video content from the central media server 216 to set-top box(es) 150 using the separate non-ATM based VOD transport network 360. In one preferred embodiment, the separate VOD transport network 360 is a digital video broadcasting-asynchronous serial interface (DVB-ASI) fiber transport network. DVB-ASI transport link is capable of transporting video content in the native MPEG format without conversion. Currently transporting video content in MPEG-2 format is preferred, but other MPEG formats are possible. This increases the efficiency of the fiber transport network and allows a higher number of data streams to be broadcast over the VOD transport network 360. Other alternatives to DVB-ASI exist; however, they are not currently preferred for various reasons. For example, a Dense Wavelength Division Multiplexing (DWDM) network could be used, but a DWDM system requires modulators to be co-located in the centralized media servers, which is not preferred for large systems that require several hundreds or thousands of modulators.

Additionally, by transporting the video content in MPEG format, the data stream can be supplied in real time instead of caching the stream in a buffer as was necessary for the ATM networks. Notice that the resource management software could use the multi-purpose transport network 360; however, because most television systems already have installed a limited-scope data network 260 (based on an ATM system, for example) it is currently preferred to continue to use an established system for VOD resource management.

In order to transfer the video content from the media servers onto the DVB-ASI transport network 360, a DVB-ASI interface 362 is provided at the central headend station 110 and a corresponding DVB-ASI interface 364 is provided at the hub stations 330. The DVB-ASI interface 362 multiplexes several DVB-ASI signals and converts the signals to an optical format compatible with the fiber DVB-ASI transport network 360. In a currently preferred embodiment, multiplexing the DVB-ASI signals provides a transfer rate of several Gbits/second in an aggregate throughput. Content transport via 1 GbitE and 10 GbitE is expected in the near future. Standard Dense Wavelength Division Multiplexing methods would further increase the throughput in the optical domain.

After multiplexing several signals in the electrical domain, the DVB-ASI interface 362 transfers the data stream from central headend station 110 to DVB-ASI transport network 360 for delivery to hub stations 330. From hub stations 330, a second DVB-ASI interface 364 demultiplexes the DVB-ASI signal and converts it back to an electrical signal. The MPEG data streams (generated either locally from the hub media server or remotely form the central media server) then enter a RF management system 370. An RF management system 370 manages, processes, and modulates the signal for delivery to the broadband distribution network 125, which in turn delivers the signal to the set-top boxes. In order to do this, RF management system 370 includes quadrature amplitude modulation devices (QAM), combiners, combiner/splitters, and transmitters (which are all explained in more detail in conjunction with FIG. 4), that transfer the data stream from the VOD transport network 360 (i.e., the central media server 216) or the hub media server 332 for delivery to set-top box(es) 150 over distribution network 125. Notice that the AM supertrunk 380 is also capable of being used for delivery of VOD assets and content, which will be explained further below. AM supertrunk 380 also uses the RF management system 370 to transfer video content to distribution network 125 for delivery to set-top box(es) 150. However, because the AM supertrunk uses QAMs in the central headend station, and because the signal on the AM supertrunk is already RF modulated, it does not use the QAMs in the hub. Instead, it connects directly to the 440 combiner/divider in the hub for distribution via 125 to the set top box.

Another advantage of the narrow cast, native format content transport network 360 is a drop, add, pass (DAP) feature that allows some interconnectivity between the hub media servers over the transport network 360. For example, assume a subscriber connected to a hub media server A requests VOD assets stored only on hub media server B. The resource management software could reuse the available bandwidth on the VOD transport network 360 to stream the VOD asset from the hub media server B over the VOD transport network 360 and through the interfaces to the requesting subscriber. Basically, as one of ordinary skill in the art would now recognize, the resource management software uses hub media server B as the central media server for the VOD asset stored only on hub media server B. Further, if configured properly, the resource management software could use any hub media server as the central media server or as an ancillary (supplemental) server that stores content unique to a particular user group.

Distributed VOD Hub Station

Figure 4A:
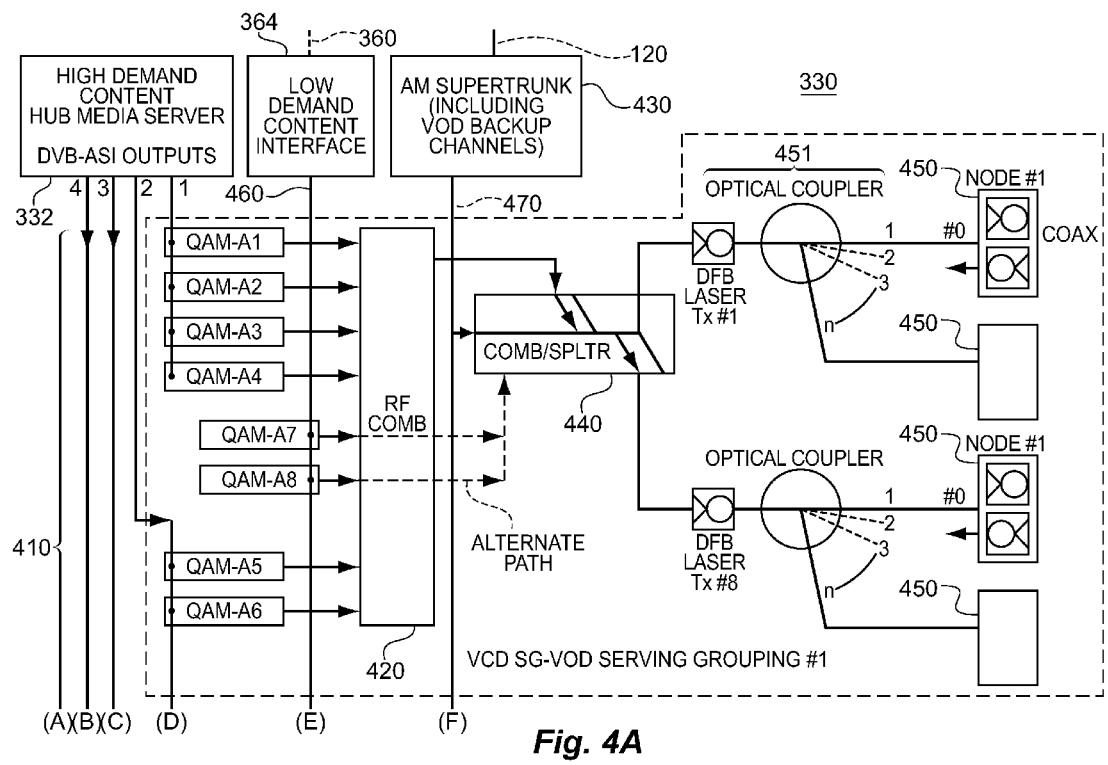
FIGS. 4A and 4B illustrate a schematic diagram of hub station 330 of FIG. 3.
Figure 4B:
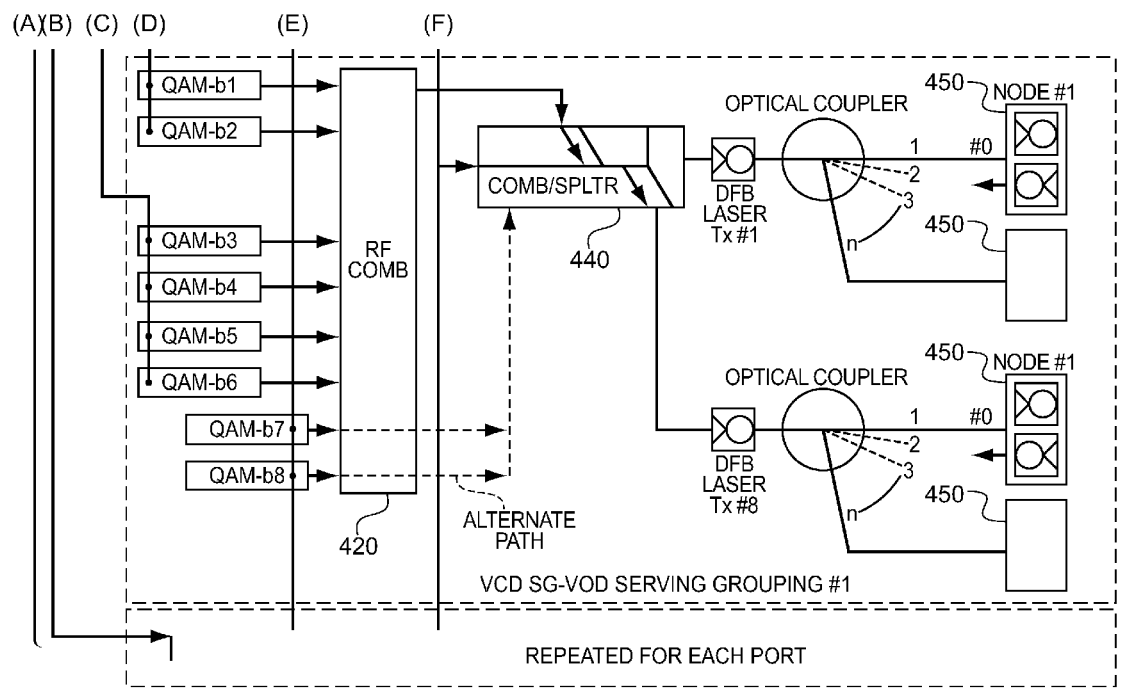

FIGS. 4A and B illustrate a portion of the hub station 330 in more detail. Hub station 330 includes all the equipment for conventional digital/analog broadcast from digital/analog broadcast infrastructure 212 over AM supertrunk fiber transport network 120, not specifically shown in FIG. 4. FIG. 4 also shows that in one embodiment of the present invention, hub station 330 includes hub media server 332, a plurality of QAMs 410.sub.a1-410.sub.b8, the DVB-ASI interface 364, a plurality of radio frequency combiners 420, an AM supertrunk interface 430, a plurality of combiners/splitters 440, and a plurality of distribution nodes 450 (in actuality the nodes are not located in the hub station 330, but are shown in FIG. 4 for completeness). In our example, a plurality of laser transmitters 451 having optical couplers are used to allow a single combiner/splitter 440 to supply data streams to several distribution nodes 450. As demand for VOD services increases, the combiner 440 would be reconfigured to provide a dedicated VOD QAM group to each laser and node. Each distribution node includes a fiber optic to coax cable converter, not shown, that connects to the set-top box 150, also not shown.

AM supertrunk interface 430 uses a portion of the conventional digital/analog broadcast infrastructure 212 and a portion of the transport network 120 that is dedicated for VOD. In particular, it is preferred to dedicate a number of QAMs in the central headend station 110 associated with the digital/analog broadcast infrastructure 212 and some bandwidth on transport network 120 for use with VOD. AM supertrunk interface 430 is only described with regard to how it is used in supplying VOD services and not with regard to conventional digital/analog broadcasts. Finally, hub station 330 includes both coax bus or splitter network 460 capable of carrying DVB-ASI signals and coax bus or splitter network 470 capable of carrying RF modulated signals.

As shown in FIG. 4, hub media server 332 has ports 332-1, 332-2, 332-3, and 332-4 connected to at least one QAM 410. In particular, hub media server 332, port 332-1 is connected to QAM 410.sub.a1, QAM 410.sub.a2, QAM 410.sub.a3, and QAM 410.sub.a4. Note that newer QAM modulators support multiple inputs which increases system reliability. For clarity sake, however, such a configuration is not depicted on FIG. 4. While hub media server 332 is shown with four ports, it is possible to design media servers having more or less ports. Additionally, while FIG. 4 shows port 332-1 connected to four QAMs, it is possible to design media servers having ports capable of supporting more or less QAMs as desired. The example depicts large media servers having eight ports and small media servers having four ports. If the ports and QAMs are being used to their full capacity, each port of these media servers can feed at least four QAMs. In other words, a small media server (having four ports) is capable of supplying data streams to sixteen or more QAMs. Currently, it is common to use QAMs capable of supplying up to 10 data streams (i.e., one QAM, such as QAM 410.sub.a1, could supply a dedicated data stream to ten (10) different set-top boxes simultaneously). The number of data streams supported by each QAM is dependent on the compression ratios chosen, which are a matter of design choice and can be more or less than ten streams per QAM as desired. Each set-top box downstream from the QAM thus needs to be both instructed to be tuned to the proper RF channel and instructed to extract a particular signal from the transmitted multiplex to receive the requested asset or content. Notice, from a design point of view it is unlikely that each and all QAMs will provide ten data streams at any given moment; therefore, it is actually (while not depicted on the drawing) preferable to allow any single port from the media server to supply signals to more than four QAMs. This increases the likelihood that the media server fully utilizes its output capacity.

In this embodiment, when operating at full capacity, a small media server (i.e., one with four ports in this example) can supply VOD services to approximately 160 separate set-top boxes (4 ports.times.4 QAMs/port.times.10 steams/QAM=160 data streams). In our example, 4 ports can supply at most 160 data streams regardless of how many QAMs exist. The number of data streams that a server can supply is limited somewhat by current technology. Currently, typical transfer rate from a port of the media server is about 160 Mbits/second (theoretically, this transfer rate is closer to approximately 270 Mbits/second for DVB/ASI ports). Given that each MPEG-2 data stream uses a transfer rate of about 4 Mbits/second, the total number of data streams from each port is approximately 40 steams/port. Of course, if the transfer rate necessary to transfer the data stream decreases or the ability of each port to transfer data increases, the number of channels supplied from a server will increase.

Data Stream Paths

Hub Server Supplied Data Stream

Figure 5:
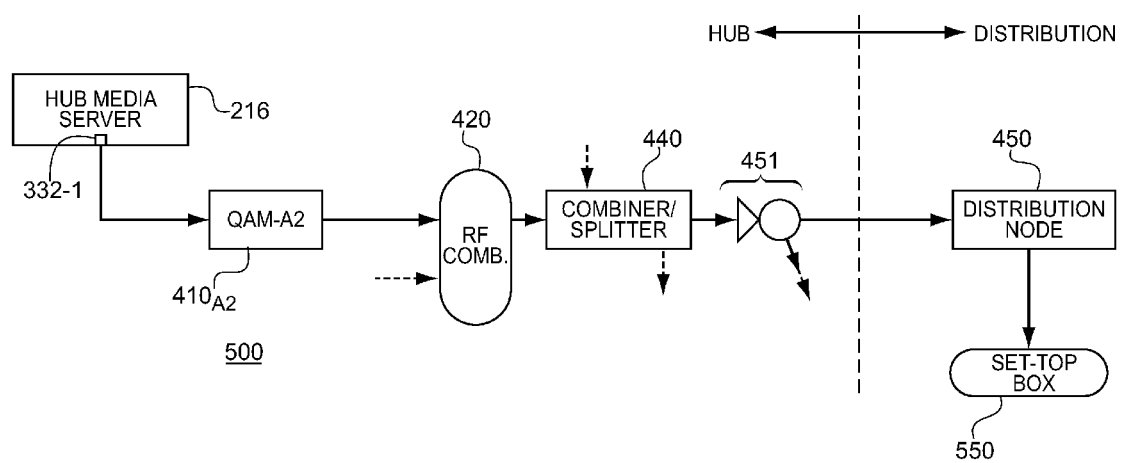
FIG. 5 is a block diagram of one potential data stream path in accordance with an embodiment of the present invention.

In operation, hub media server 332 supplies a data stream to set-top box 150 when a viewer requests a particular video content or asset. FIG. 5 shows one possible path 500 a data stream could take from hub media server 332 to a particular set-top box 550. On request and after assigning a data stream path, hub media server 332 begins broadcast of the requested video content using conventional protocols, such as MPEG-2 format. In this example, hub media server 332 transmits the data stream out port 332-1 to QAM 410.sub.a2. From QAM 410.sub.a2, the data stream travels to combiner 420. The data stream travels from combiner 420 to distribution node 450 over combiner/splitter 440 through transmitter 451. Finally, the data stream arrives at set-top box 550. Note that while FIG. 5 represents one path to one set-top box, the data stream is actually transported to several set-top boxes simultaneously. Other set-top boxes, however, are not instructed to be tuned to the particular channel and extract the particular data stream, as long as the stream is under exclusive control of a single user.

As shown in FIGS. 4 and 5, set-top box 550 can receive the data stream using a number of different channels (which will be explained further below). For example, the data stream could have traveled from hub media server port 332-1, over QAM 410.sub.a4 to combiner 420. The data stream path from combiner 420 to set-top box 550 would be identical to the one shown above in FIG. 5. Alternatively, the hub media server could have sent the data stream out port 332-2 over QAM 410.sub.a5, etc. In other words, the distributed VOD system of the present invention is dynamic and allows the system to assign resources as they are available.

Non-Hub Server Supplied Data Stream

Figure 5A:
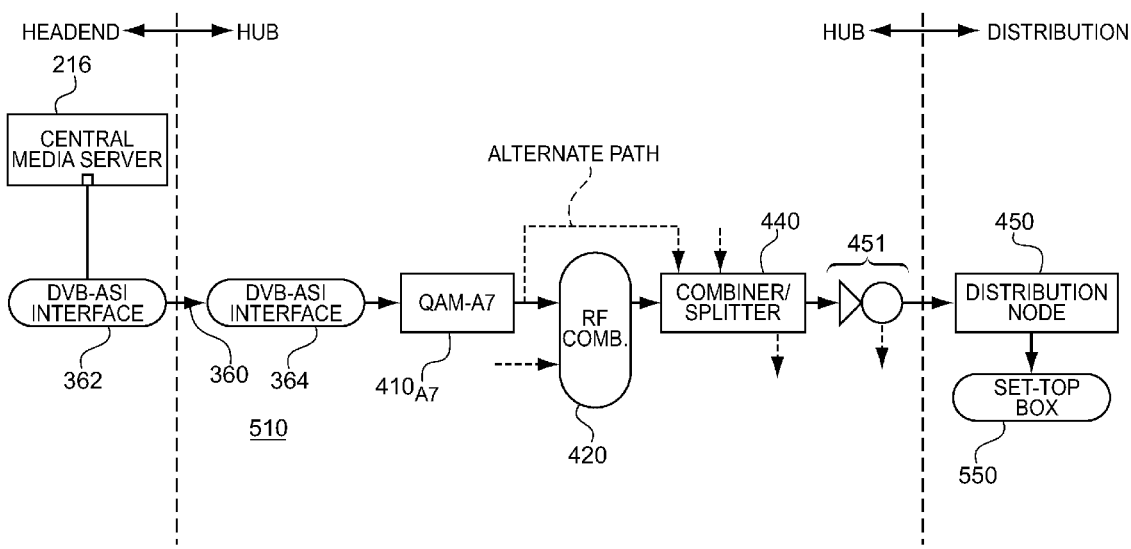
FIG. 5A is a block diagram of another potential data stream path in accordance with an embodiment of the present invention.
Figure 5B:
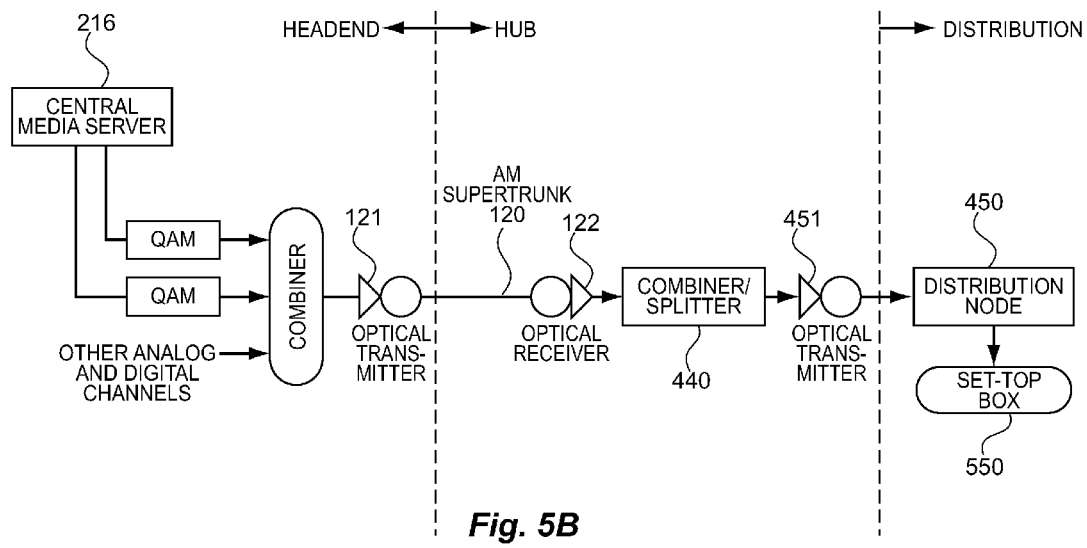
FIG. 5B is a block diagram of yet another potential data stream path (used primarily for backup and overflow/oversubscription instances) in accordance with an embodiment of the present invention.

Instead of having the data steam originate at hub media server 332, as shown in FIGS. 4 and 5, it is also possible for the data stream to originate from central media server 216. FIGS. 4, 5A and 5B show a path 510, not illustrated, a data stream could take from central media server 216. Central media server 216 would broadcast the video content from one of its ports, not specifically labeled, over the DVB-ASI interface 362 and the native format content transport network 360 to the hub DVB-ASI interface 364 through, for example, QAM 410.sub.a7 that would then deliver the data stream to set-top box 550 over combiner 420, combiner/splitter 440, transmitter 451, and distribution node 450 as explained above.

Preferably, the data stream could originate from central media server 216 only for a limited number of reasons. In a preferred embodiment, the data stream would originate from central media server 216 either because:

the resources between hub media server 332 and set-top box 550 are unavailable, e.g. streaming capacity of the hub server and/or local QAMs has been used up by other users;

the resources are not functioning (due to break, repair, system maintenance, etc.);

the requested video content is not currently stored in the hub media server 332. As was explained above, in a preferred embodiment hub media server 332 only stores "high demand" video content.

Similarly, as shown in FIG. 4, if resources from central media server 216 over DVB-ASI network 360 are not available, the video content requested could also be sent over the transport network 120 using AM supertrunk as depicted in FIG. 5B. The AM supertrunk has its own QAMs located in the central headend station 110 that are dedicated for VOD services (not specifically labeled). Moreover, when using the AM supertrunk, the signal on the transport network 120 is already RF modulated by the QAMs in the central headend station 110. Therefore, when this path is used for the video content, the AM supertrunk interface feeds directly into combiner/splitter 440 and bypasses the hub QAMs 410 and RF combiner 420. From combiner/splitter 440, the data stream would travel the same path to set-top box 550 as described in conjunction with either FIG. 5 or FIG. 5A.

The hybrid central/distributed VOD system provides both fault tolerance and tiered content selection and delivery. It is currently preferred to allow each set-top box to receive data streams from at least two servers and to access at least two server ports from each server, wherein the data stream can travel over at least three different paths. Fault tolerance occurs because the system dynamically assigns available resources. Thus, if one data stream path fails, a different data stream path is chosen. It is a tiered service system because the first choice high demand video content is supplied primarily from the hub media server (first tier) and low demand video content is supplied from the central media server (second tier). Additional tiers could also be provided. For example, obscure video content could be stored in a media server only deliverable over the AM supertrunk, which would provide a third tier. Notice that as you move higher in tiers, the fault tolerance is reduced. In other words, first tier video content, high demand, can be supplied over the second tier (central media server and DVB-ASI transport network) or the third tier (AM supertrunk). However, low demand video content can only be supplied from the second or third tier, etc. In other words, video content stored on the hub media server (which is also stored on the central media server) has two installed backup paths. If the primary source path of the video content or asset (the hub media server) is unavailable, paths could be established from the central media server using either the DVB-ASI network or the AM supertrunk. Normally, video content or assets are supplied from the central media server via native format content transport. This path has one installed backup path, the AM supertrunk.

Figure 6:
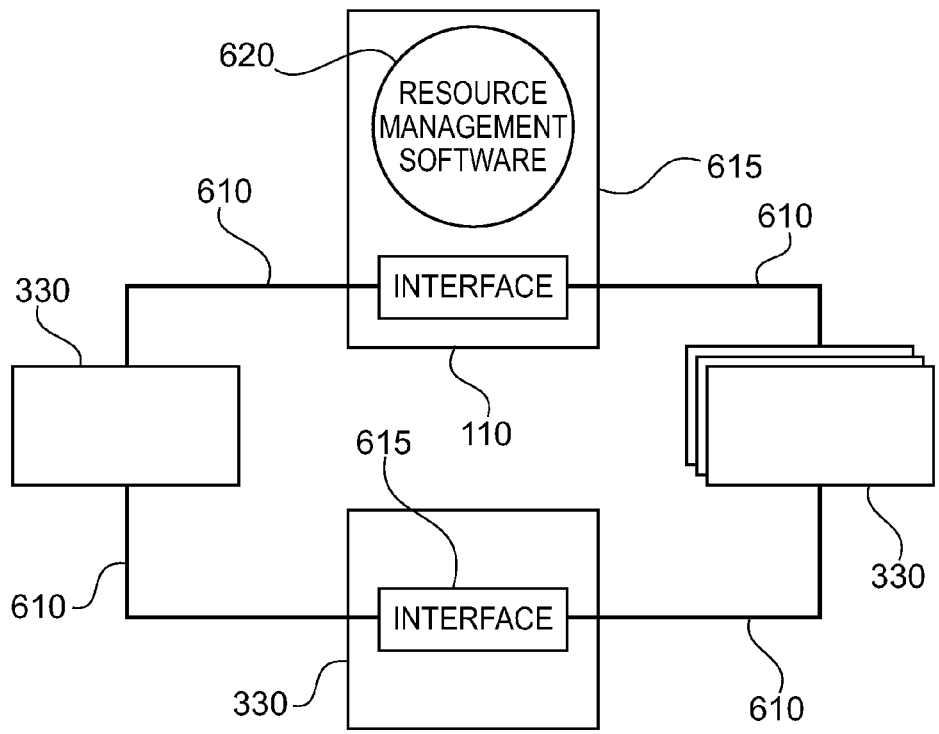
FIG. 6 is a system wide schematic diagram of a data network in accordance with an embodiment of the present invention.

While, in the above example, set-top box 550 could receive the data stream from hub media server 332 port 332-1 over QAMs 410.sub.a1-410.sub.a4 or port 332-2 over QAM 410.sub.a5-410.sub.a6, it could not receive the signal from port 332-2 over QAM 410.sub.b1. As will be explained in more detail below, assigning available resources depends, in part, on what resources (hub servers, central server, AM supertrunk, ports, and QAMs) are capable of being used with any given set-top box 550. System resource available for any given set-top box 550 are stored in a database 800 (which will be explained below in conjunction with FIG. 8) located in the central headend station 110 as part of the resource management software. As shown in FIG. 6, resource management software 620 communicates with the central headend station 110 and the hub stations 330 using a data network 610, which in one preferred embodiment is an ATM system using 100 BaseT IP protocol. Data network 610, however, could be many different types of high speed networks including, for example, the multi purpose transport network 360. Data network 610 includes data network interface 615. Control signals on the data network 610 assign resources as they are available in a conventional manner based on the database as will be explained further below.

Figure 7:
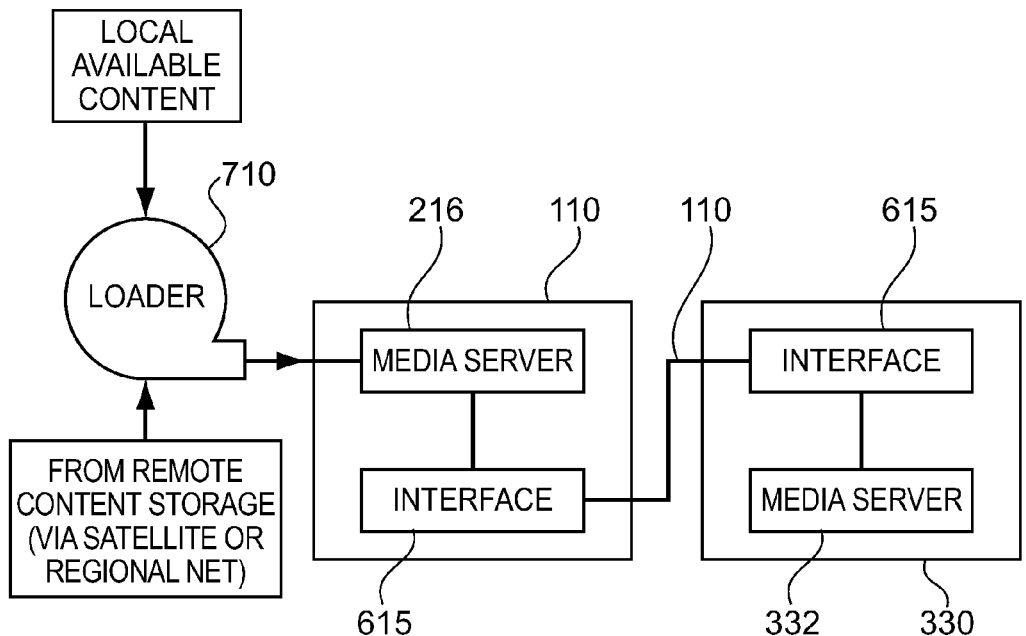
FIG. 7 is a block diagram showing the loading of video content in accordance with an embodiment of the present invention.

Data network 610 also facilitates loading video content from central media server 216 in headend station 110 to hub media servers 332 in hub stations 330. FIG. 7 shows a loader 710 connected to central media server 216. Loader 710 can be a conventional loader that uses DLT tapes (or some other form of media that is MPEG encoded) to load content into central media server 216. Alternatively loader 710 could receive content from a satellite link, an Internet link, etc. to load content into central media server 216. Once video content is loaded into central media server 216, central media server 216 propagates (file transfers or downloads) the desired high demand video content over data network 610 to hub media servers 332. Notice that the system also allows the possibility of selectively transferring video content to hub media servers 332 so that some hub media servers receive particular video content and other hub servers do not receive that video content (e.g., ethnic programming, targeted advertising, etc.). Moreover, while each hub media server 332 could have its own loader associated with it, it is desirable to use only one loader 710 and to multicast the high demand video content to each hub media server 332 simultaneously. The other advantage of a centrally located loader is related to the fundamentals of the hybrid central/distributed VOD system. As the real-time events (live events such as sports and news) are typically received only at the main headend, the encoding and loading of such content is inherently easier and less costly at a central site versus at each hub individually.

Transport Stream Identification

Each set-top box 150 or 550 has assigned to it a particular set of data stream resources. As explained above, these resources include media servers, ports, and QAM channels. While it is possible to have only one path assigned to each set-top box, it is preferable to assign several paths to each set-top box. When multiple paths are available, the resource management software must assign a single path from a choice of multiple available paths when the set-top box requests a VOD asset or content. The resource management software uses a "look-up table" style system to dynamically assign optimum paths.

FIG. 8A shows one possible database 800 assigning "Transport Stream Identifier" (TSID) numbers to data stream paths. Database 800 includes several columns. Column 802 contains the hub station name, column 804 contains the server number, column 806 contains the port number, and column 808 contains the QAM number. Columns 804, 806, and 808 form the TSID number that identifies a particular stream path. For example, in a television system that has three hub stations, Atlantis, Gotham, and Metropolis, column 802 would list each station. To accommodate the resources at each station, each station entry has several assigned rows for each server at the station. Each station could have more than one server; however, for clarity only the Atlantis station will be described with two servers, both Gotham and Metropolis will be confined to one server per station. Also, while each server could be larger or smaller, only the Atlantis station will be described as larger servers with eight ports, which essentially means the Atlantis station servers will have more ports than the Gotham and Metropolis station servers, which will be described with four ports.

As shown in database 800, column 804 shows that the Atlantis station has server 01 and 05 (two servers). Column 806 shows server 01 has ports 1, 2, 3, 4, 5, 7, and 8 and server 05 has ports 1, 2, 3, 4, 5, 6, and 8. Column 808 shows server 01, port 1, has QAM 1, 2, and 3. Further server 01, port 2, has QAM 1, 2, etc. Notice server 01 does not have port 6 identified and server 05 does not have port 7 identified. Moreover, server 01, port 1 does not identify a QAM 4. While these devices could be identified and used, in our example they have been reserved to support future growth.

As shown in database 800, Gotham station (column 802) has server 10 (column 804). Column 806 shows server 10 has ports 1, 2, 5, and 6. Column 808 shows, for example, server 10, port 1 has QAM 1, 2, 3, and 4. Further column 802 of database 800 shows Metropolis station. Metropolis station has server 15 (column 804) with ports 1, 2, 5, and 6 (column 806). Column 808 shows server 15, port 1 has QAM 1 and 2.

Database 800 identifies each stream path by a combination of four digits (two for the server, one for the port, and one for the QAM; notice this standard is exemplary only). Thus, one data stream path is 1013, which is the Gotham station server, port 1, QAM 3. As can be seen in column 810, data stream path 1013 is assigned a radio frequency (RF) channel 93, for example. Thus, for the downstream set-top box to receive the data stream requested over path 1013, the set-top box must be instructed to be tuned to channel 93. Moreover, the set-top box would be instructed to extract a particular video stream from the multiplexed video streams being delivered over channel 93.

Column 810 of database 800 shows data stream paths represented by TSID numbers 0111, 0112, and 0113 being assigned to channels 92, 93, and 94, respectively. As shown in Column 812, these data streams are assigned a group identifier G1. Group G1 is assigned to transmitters 1, 2, and 3, as represented by columns 814, 815, and 816, which feed data streams to assigned set-top boxes. Similarly, TSID number 0121, 0122, and 0123 also are assigned to channels 92, 93, and 94. These data streams are assigned group identifier G2 that is assigned to different transmitters 4, 5, and 6, which feed data streams to different set-top boxes. Because G1 and G2 are directed to different transmitters and set-top boxes that are located on separate sections of the HFC distribution network, they can be assigned the same RF channel without worrying about interference (this uses principles of narrow casting).

Database 800 also includes additional TSID numbers that identify data stream paths to set-top boxes from the central media server. For example, assume Atlantis server 05 is the central media server 216. Then server 05, port 1, QAMs 1 and 2 may be assigned to G1, G2, and G3 as the central server data stream path (second tier) to those transmitters. Server 05, port 5, QAM 2 may be assigned to transmitters of group G4, etc. Thus, when assigning data stream paths, the resource management software would first determine whether a hub server data path is available; if not, then the software would look to the central media server paths, such as 0551. If neither the hub server nor central server has paths available, the resource management software would look to the AM supertrunk portion of database 800, not specifically shown, to determine whether the video content could be supplied over an AM supertrunk path. Furthermore, the groupings and identification numbers are exemplary. Moreover, the TSID numbers could be assigned automatically (autoprovisioning) and/or randomly, but it is currently preferred to manually assign TSID numbers to follow particular conventions. Formally assigning TSID numbers to follow a convention is preferable because a fault in a particular data stream path can be readily isolated and identified by the TSID number. In other words, stream 1011 is always the Gotham station server, port 1, QAM 1. If the TSID numbers were assigned randomly, the relationship may not be as readily apparent.

Assuming hub station 330 of FIG. 4 is Gotham station, then hub media server 332 is represented by server 10 in database 800. Further, ports 332-1, 332-2, 332-3, and 332-4 from FIG. 4 correspond to ports 1, 2, 5, and 6 in database 800. Also, QAMs 410.sub.a1-410.sub.a4 from FIG. 4 correspond to QAMs 1, 2, 3, and 4 in database 800. Still further, central media server 05, port 6, QAMs 1 and 2 in database 800 represent the data stream path into QAMs 410.sub.a7 and 410.sub.a8 from FIG. 4.

VOD Ordering and Assigning Paths

Figure 9A:
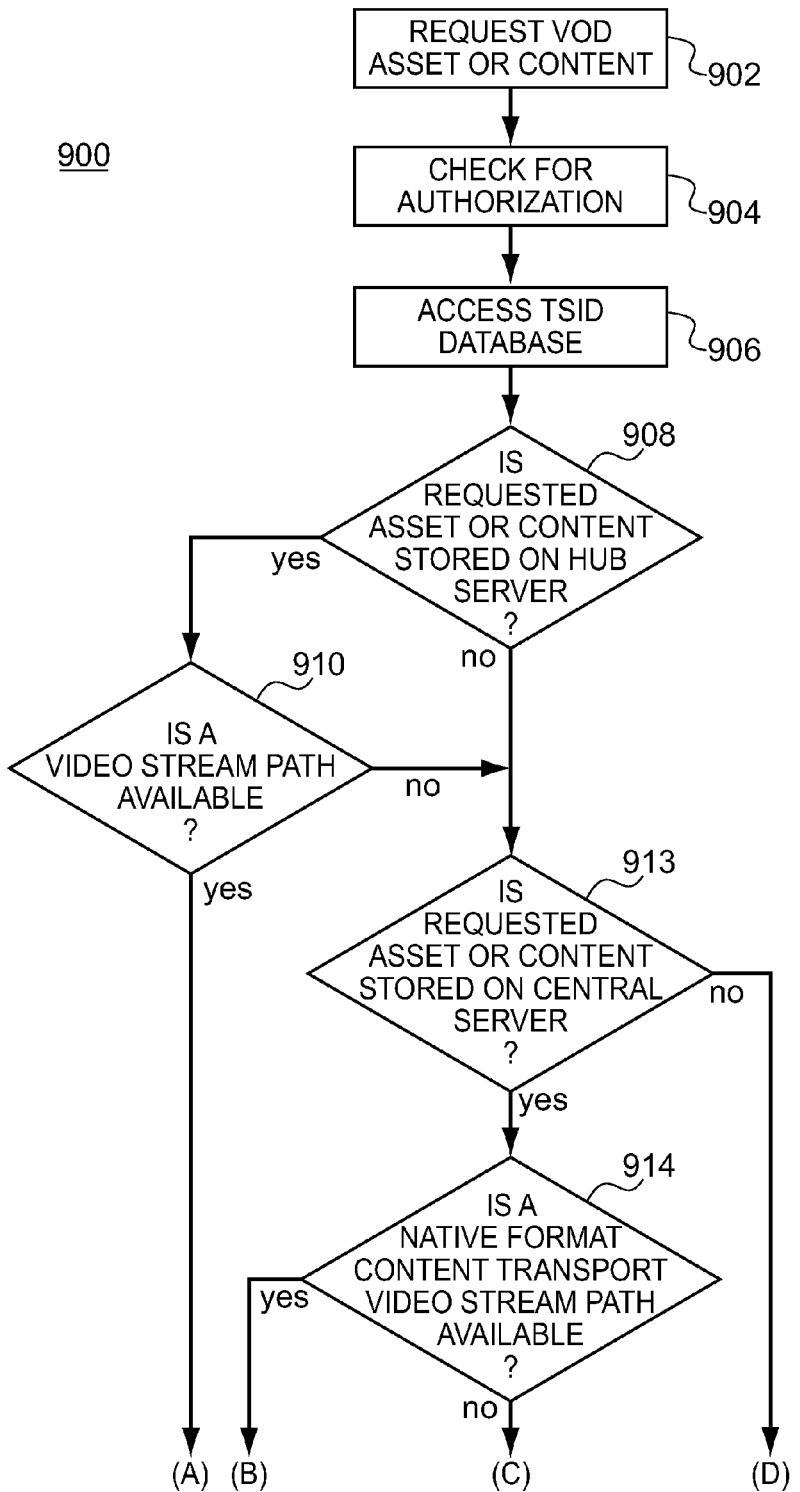

FIG. 9 is a flow chart 900 describing the process associated with ordering a VOD asset or content and assigning a particular data stream, i.e., TSID. First, a user at a set-top box requests a VOD asset or content from a menu on a television screen, step 902. The request is checked by the back-office software to ensure the user is authorized to request and receive the VOD content or asset, step 904. Once authorization is checked and confirmed, the resource management software accesses database 800 to identify and assign an available data stream path, step 906. To assign a path, the resource management software first determines whether the requested asset or content is stored in the hub media server, step 908.

If the requested VOD asset or content is stored on the hub media server, then the resource management software determines whether data stream path resources are available from the hub media server, set 910.

If a hub media server path is available, the resource management software assigns that path to the requesting set-top box and indicates that those resources are being used, step 912.

If no hub media server paths are available or if it is determined that the requested VOD asset or content is not stored in the hub server, then it is determined whether the requested asset or content is stored in the central media server, step 913.

If the requested content is not stored in the central media server (notice, as explained previously above, the resource management software could also look to other hub media servers to supply the requested content), then a fault indication is broadcast to the set-top box, step 922.

When the content is located on the central media server, the resource management software determines whether data stream path resources are available from the central media server, step 914.

If at least one path from central media server 216 over transport network 360 is available, the resource management software assigns that path to the requesting set-top box and indicates that those resources are being used, step 916.

If no central media server paths are available over transport network 360, the resource management software determines whether data stream path resources are available from the AM supertrunk, step 918.

If at least one AM supertrunk path is available, the resource management software assigns that path to the requesting set-top box and indicates that those resources are being used, step 920.

If no paths are available, a fault indication is broadcast to the set-top box, step 922. The fault indication could be a message simply stating the VOD asset or content is currently unavailable.

If the resource management software assigned an available data stream path, the data stream path is established using conventional protocols and handshaking checks, step 924.

Once the path is established, the resource management software tunes the set-top box to the appropriate RF channel, step 926. For example, referring to database 800, if the path was TSID number 1013, the resource management software would tune the set-top box to RF channel 94. Next, the resource management software instructs the set-top box to extract the proper signal from the multiplexed data stream, step 927. Once the set-top box is tuned, instructed to which signal should be extracted, and the handshaking has been performed, the media server begins streaming the video content to the set-top box, step 928.

In an embodiment of the present invention, a content delivery system capable of delivering content on demand comprises a headend station, a first type hub station, a set-top box, a content transport network, and a distribution network. The headend station comprises a central media server. The first type hub station comprises a hub media server and a radio frequency management infrastructure coupled to the radio frequency management infrastructure.

In an embodiment of the present invention, the radio frequency management infrastructure comprises a QAM, a radio frequency combiner coupled to the QAM to form QAM subgroups, a combiner/splitter to form QAM groups and to direct the radio frequency modulated content stream via an appropriate transmitter to the appropriate set-top box, and an optical transmitter coupled to the combiner/splitter to convert the radio frequency modulated content stream into a format suitable for transmission over the distribution network.

The content transport network couples the central media server to the radio frequency management infrastructure. The distribution network couples the radio frequency management infrastructure to the set-top box. Content on demand services originating at either the hub media server or the central media server are supplied to the set-top box through the radio frequency management infrastructure.

In another embodiment of the present invention, the content delivery system further comprises a broadband radio frequency network that comprises an AM supertrunk that couples the central media server to the radio frequency management infrastructure.

In still another embodiment of the present invention, the content transport network is capable of distributing a MPEG format content stream. By way of illustration and not as a limitation, the content transport network may be a fiber digital video broadcasting-asynchronous serial interface (DVB-ASI) network.

In yet another embodiment of the present invention, the content delivery system further comprises an interface coupled to the central media server and the fiber DVB-ASI network that converts an electrical MPEG format content stream into an optical MPEG format content stream capable of being transferred over the fiber DVB-ASI network.

In another embodiment of the present invention, the content delivery system further comprises an interface coupled to the fiber DVB-ASI network and the radio frequency management infrastructure that converts an optical MPEG format content stream into an electrical MPEG format content stream capable of being managed by the radio frequency management infrastructure.

In yet another embodiment of the present invention, the radio frequency management infrastructure comprises a quadrature amplitude modulation device (QAM). In still another embodiment of the present invention, the content delivery system further comprises a resource management processor that causes the requested content on demand to be provided to the set-top box over a particular content stream path originating from either the hub media server or the central media server. By way of illustration and not as a limitation, the content may be linked to remote hub radio frequency management infrastructure using the content transport network. Additionally, the resource management processor may be coupled to the radio frequency management infrastructure using a data network.

In another embodiment of the present invention, the content delivery system further comprises a second type hub station that does not have the hub media server. In yet another embodiment of the present invention, the content delivery system further comprises a resource management processor that causes the requested content on demand to be provided to the set-top box from the central media server through the second type hub station.

In an embodiment of the present invention, the content transport network includes a drop, add, pass feature. In this embodiment, the hub media server can supply content on demand services to another hub station over the content transport network using the drop, add, pass feature of the content transport network. In this embodiment, the radio frequency management infrastructure and an information database is coupled to a resource management processor to determine a particular content stream path for delivery of the content stream to the set-top box.

In an embodiment of the present invention, a content delivery network capable of supplying content on demand (COD) services comprises a central headend station having a resource management processor. The resource management processor is coupled to a hub station using a network. The hub station comprises a hub media server having a content port and a radio frequency management infrastructure.

In an embodiment of the present invention, the radio frequency management infrastructure comprises a QAM, a radio frequency combiner coupled to the QAM to form QAM subgroups, a combiner/splitter to form QAM groups and to direct the radio frequency modulated content stream via an appropriate transmitter to the appropriate set-top box, and an optical transmitter coupled to the combiner/splitter to convert the radio frequency modulated content stream into a format suitable for transmission over the distribution network.

The radio frequency management infrastructure is coupled to the content port of the hub media server and is adapted to receive a content stream from a content transport network. The radio frequency management infrastructure is adapted to receive resource management control signals from the resource management processor to determine from where the radio frequency management infrastructure should receive the content stream. The radio frequency management infrastructure is adapted to transmit the content stream to a set-top box over a distribution network. In another embodiment of the present invention, the radio frequency management infrastructure is further adapted to receive the content stream over an AM supertrunk.

In still another embodiment of the present invention, the radio frequency management infrastructure receives a control signal from the resource management processor that identifies the QAM that should be used to provide the content stream to the set-top box.

In yet another embodiment of the present invention, the transport network is adapted to carry content streams from the central media server.

In another embodiment of the present invention, the transport network is adapted to carry content streams from other hub media servers.

An embodiment of the present invention provides a method of supplying content on demand (COD) services. A COD service is requested. By way of illustration and not as a limitation, the COD service request may comprise receiving a signal from a remote control device. A COD asset database is accessed to identify COD assets that are capable of supplying the requested COD service. A determination is made as to a COD asset that is available to deliver the requested COD service. A content stream path is identified based on the COD asset determined to be available. The identified content stream path is assigned to supply the requested COD service. The requested COD service is supplied over the assigned content stream path.

In another embodiment of the present invention, a broadcast of a COD service that is capable of being requested is received and a menu of the COD service that is capable of being requested is displayed.

In yet another embodiment of the present invention, a determination is made whether authorization to deliver the requested COD service exists.

In still another embodiment of the present invention, a determination is made whether the requested COD service is stored on a hub media server and whether a content stream path associated with the hub media server is available. The content stream path associated with the hub media server is assigned if the content stream path associated with hub media server is available.

In yet another embodiment of the present invention, a determination is made whether the requested COD service is stored on a central media server and whether a content stream path associated with the central media server is available. The content stream path associated with the central media server is assigned if the content stream path associated with the hub media server is not available.

In another embodiment of the present invention, a determination is made whether the requested COD content is stored only on a central media server. A content stream path associated with the central media server is assigned if it is determined that the requested COD content is stored only on the central media server.

In yet another embodiment of the present invention, a determination is made whether a content stream path associated with the central media server is available over a content transport network. The content stream path associated with the central media server is assigned over an AM supertrunk if the video stream path over the content transport network is not available.

In still another embodiment of the present invention, a fault is indicated if no content stream paths are available.

In yet another embodiment of the present invention, the set top box is instructed to tune to the appropriate radio frequency channel to receive the requested COD service and to extract an appropriate content stream from a received multiplexed signal to deliver the requested COD content.

In even another embodiment of the present invention, a database having COD service assets available to a set-top box is created. Whether assets are currently in use is indicated.

In an embodiment of the present invention, a computer program product comprises a computer usable medium including computer readable code embodied therein for processing data to process requests for COD service. The computer usable medium comprises a requesting module, a determining module, a COD asset database, an identifying module, an assigning module, and a supplying module. The requesting module is configured to receive requests for COD services from a viewer. The determining module is configured to access the COD asset database that identifies COD assets capable of being used to deliver the requested COD service and to determine whether COD assets are available to deliver the requested COD service. The identifying module is configured to identify a particular content stream path from the COD assets determined to be available. The assigning module assigns the identified content stream path to deliver the requested COD service and update the COD asset database to indicate the COD assets are no longer available. The supplying module is configured to supply the requested COD service over the assigned content stream path.

In another embodiment of the present invention, the requesting module is further configured to receive requests from a remote control device.

In yet another embodiment of the present invention, the computer usable medium further comprises a displaying module configured to receive a broadcast of a COD service capable of being requested and displaying the COD service to the viewer.

In even another embodiment of the present invention, the computer usable medium further comprises an authorizing module configured to check whether the requested COD service is authorized for delivery.

An embodiment of the present invention comprises a database for storing COD assets capable of delivering a content stream over a content stream path. The database comprises a server identifier for each media server capable of delivering COD services to a set-top box, a port identifier for each port associated with each media server, and a QAM identifier for each QAM associated with each port, wherein the server identifier, port identifier, and QAM identifier indicate the COD assets associated with a particular content stream path associated with delivering COD services to the set-top box.

A hybrid central/distributed and tiered video on demand (VOD) service network with tiered content structure has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A system for selecting a network path for delivering on-demand content comprising:
a first location comprising a first media server and a resource management processor;
a second location remote from the first location comprising a second media server, wherein the first and second locations are connected via a first network segment and a second network segment;
wherein the second media server in the second location is sized to support expected peak demand for on-demand content, wherein the first media server in the first location and first network segment are sized for providing on-demand content from the first location to the second location to support an incremental demand level for on-demand content, and wherein the incremental demand level is less than the expected peak demand; and
a video termination device, wherein the video termination device is connected to the second location via a distribution network and wherein the video termination device comprises an instruction for sending a request for a particular on-demand content to the resource management processor; and
wherein the resource management processor comprises instructions for:
selecting a source from which to obtain the particular on-demand content from the first media server and the second media server in response to the request sent from the video termination device;

selecting a path over which to deliver the particular on-demand content to the video termination device; and wherein the instruction for selecting a path comprises:
if the selected source is the second media server, then selecting the distribution network as the selected path;
if the selected source is the first media server, then selecting the first network segment, if available, and the distribution network as the selected path; and
if the selected source is the first media server and if the first path is not available, then selecting the second network segment and the distribution network as the selected path; and wherein the selected source delivers the particular on-demand content over the selected path to the video termination device.

2. The system of claim 1 further comprising a third network segment and wherein the first media server delivers on-demand content to the second media server via the third network segment.

3. The system of claim 1, wherein the instruction for selecting a content source comprises determining if the particular on-demand content is available from the second media server and if the particular on-demand content is not available from the second media server then determining if the particular on-demand content is available from the first media server.

4. The system of claim 1,
wherein the system further comprises a third location that is remote from the first and second locations, and wherein the third location comprises a third media server;
wherein the third location and the first location are connected via the first and second network segments;
wherein the second location and the third location are connected via the first network segment;
wherein the resource management processor further comprises instructions for selecting a source from which to obtain the particular on-demand content from the first media server, the second media server and the third media server in response to the request sent from the video termination device;
wherein the instruction for selecting a path further comprises if the selected content source is the third media server, then selecting the first network segment and the distribution network as the selected path, wherein the first network segment transports the particular on-demand content to the second location from the third media server and wherein the particular on-demand content is delivered from the second location to the video termination device via the distribution network.

5. The system of claim 4, wherein the instructions for selecting a content source comprise determining if the particular on-demand content is available from the second media server and if the particular on-demand content is not available from the second media server then determining if the particular on-demand content is available from the third media server located at the third location.

6. The system of claim 1, wherein the first network segment is capable of distributing an MPEG format content stream.

7. The system of claim 6, wherein the content transport network is a fiber digital video broadcasting-asynchronous serial interface (DVB-ASI) network.

8. The system of claim 7 further comprising an interface coupled to the first media server and the fiber DVB-AS1 network, wherein the interface comprises instructions for converting an electrical MPEG format content stream into an optical MPEG format content stream capable of being transferred over the fiber DVB-ASI network.

9. The system of claim 1, wherein the video termination device comprises a tuner and wherein the resource management processor further comprises instructions for:
receiving the request for the particular on-demand content from the video termination device;
selecting a tuner frequency at which the particular on-demand content can be received by the video termination device; and
instructing the video termination device to tune the tuner to the tuner frequency; and wherein the video termination device further comprises instructions for:
receiving the tuner instruction from the resource management processor; and
tuning the tuner to the tuner frequency.

10. A method for selecting a network path for delivering on-demand content comprising:
a video termination device sending a request for a particular on-demand content to a first location via a second location, wherein the first location comprises a first media server and a resource management processor, wherein the video termination device is connected to a second location via a distribution network, wherein the second location is remote from the first location and comprises a second media server, wherein the first and second locations are connected via a first network segment and a second network segment, wherein the second media server in the second location is sized to support expected peak demand for on-demand content, wherein the first media server in the first location and first network segment are sized for providing on-demand content from the first location to the second location to support an incremental demand level for on-demand content, and wherein the incremental demand level is less than the expected peak demand;
the resource management processor selecting a source from which to obtain the particular on-demand content from the first media server located at the first location and the second media server located in the second location in response to the request sent from the video termination device;
the resource management processor selecting a path over which to deliver the particular on-demand content to the video termination device, wherein selecting a path comprises:
if the selected source is the second media server, then selecting the distribution network as the selected path;
if the selected source is the first media server, then selecting the first network segment, if available, and the distribution network as the selected path; and
if the selected source is the first media server and if the first path is not available, then selecting the second network segment and the distribution network as the selected path; and
the selected source delivering the particular on-demand content over the selected path to the video termination device.

11. The method of claim 10 further comprising the first media server delivering on-demand content to the second media server via a third network segment.

12. The method of claim 10, selecting a content source comprises determining if the particular on-demand content is available from the second media server and if the particular on-demand content is not available from the second media server then determining if the particular on-demand content is available from the first media server.

13. The method of claim 10 further comprising, the resource management processor selecting a source from which to obtain the particular on-demand content from the first media server, the second media server and a third media server located in a third location in response to the request sent from the video termination device, wherein the third location is remote from the first and second locations, wherein the third location and the first location are connected via the first and second network segments, and wherein the second location and the third location are connected via the first network segment;

and wherein selecting a path further comprises if the selected content source is the third media server, then selecting the first network segment and the distribution network as the selected path, wherein the first network segment transports the particular on-demand content to the second location from the third media server and wherein the particular on-demand content is delivered from the second location to the video termination device via the distribution network.

14. The method of claim 13, wherein selecting a content source comprises determining if the particular on-demand content is available from the second media server and if the particular on-demand content is not available from the second media server then determining if the particular on-demand content is available from the third media server located at the third location.

15. The method of claim 10, wherein the first network segment is capable of distributing a MPEG format content stream.

16. The method of claim 15, wherein the content transport network is a fiber digital video broadcasting-asynchronous serial interface (DVB-ASI) network.

17. The method of claim 16 further comprising converting an electrical MPEG format content stream into an optical MPEG format content stream capable of being transferred over the fiber DVB-ASI network.

18. The method of claim 10 further comprising:

the resource management processor receiving the request for the particular on-demand content from the video termination device;

the resource management processor selecting a tuner frequency at which the particular on-demand content can be received by the video termination device; and the resource management processor instructing the video termination device to tune the tuner to the tuner frequency;

the video termination device further receiving the tuner instruction from the resource management processor; and the video termination device tuning the tuner to the tuner frequency.

* * * * *